(12) United States Patent
Tseliakhovich et al.

(10) Patent No.: US 9,453,480 B2
(45) Date of Patent: Sep. 27, 2016

(54) EXTERNALLY POWERED HYBRID PROPULSION SYSTEM

(71) Applicant: ESCAPE DYNAMICS, INC., Broomfield, CO (US)

(72) Inventors: Dmitriy Tseliakhovich, Broomfield, CO (US); Matthew Loukas Hanover, Denver, CO (US)

( * ) Notice: Subject to any disclaimer, the term of this patent is extended or adjusted under 35 U.S.C. 154(b) by 540 days.

(21) Appl. No.: 14/060,045

(22) Filed: Oct. 22, 2013

(65) Prior Publication Data

US 2015/0040536 A1 Feb. 12, 2015

Related U.S. Application Data (60) Provisional application No. 61/716,844, filed on Oct. 22, 2012.

(51) Int. Cl.
| | | |
|---|---|---|
| *F02K 9/72* | (2006.01) | |
| *B64G 1/40* | (2006.01) | |
| *B64G 1/42* | (2006.01) | |

(Continued)

(52) U.S. Cl.
CPC ............... *F02K 9/72* (2013.01); *B64G 1/402* (2013.01); *B64G 1/404* (2013.01); *B64G 1/409* (2013.01); *B64G 1/428* (2013.01); *F02K 9/44* (2013.01); *B64G 1/405* (2013.01); *F03H 1/00* (2013.01); *F03H 99/00* (2013.01); *F05D 2300/2261* (2013.01)

(58) Field of Classification Search
CPC ...... B64G 1/405; B64G 1/409; B64G 1/404; F02K 9/72; F03H 1/00; F03H 1/0093; F03H 99/00
See application file for complete search history.

(56) References Cited

U.S. PATENT DOCUMENTS

| | | | |
|---|---|---|---|
| 3,206,925 A | 9/1965 | Schiff | |
| 3,891,160 A | 6/1975 | Minovitch | |
| 5,224,663 A * | 7/1993 | Criswell | B64D 5/00 244/1 R |

(Continued)

FOREIGN PATENT DOCUMENTS

| | | |
|---|---|---|
| EP | 0426110 | 5/1991 |
| EP | 1128468 | 8/2001 |
| WO | WO 95 11828 | 5/1995 |

OTHER PUBLICATIONS

Gimelshein et al., "Thrust Augmentation in Solid Rocket Motors Using Beamed Microwave Energy", 45th AIAA Joint Propulsion Conference & Exhibit, Denver, CO, Aug. 2-5, 2009, pp. 1-12.*

(Continued)

*Primary Examiner* — Lorne Meade
(74) *Attorney, Agent, or Firm* — Lathrop & Gage LLP (57) ABSTRACT

A hybrid propulsion system for a vehicle comprises a propellant tank for providing a supply of propellant, a propellant heater, and an exhaust nozzle. The propellant tank is in fluid communication with the propellant heater and is configured for providing a flow of propellant to the propellant heater. The propellant heater is in fluid communication with the propellant tank and the nozzle and initially comprises a supply of oxidizer that is configured for reacting chemically with the propellant to produce heat. The propellant heater is further configured for receiving a beam of microwave energy and facilitating transmission of the beam of microwave energy to the propellant. The nozzle is in fluid communication with the propellant heater and is configured for receiving a flow of propellant from the propellant heater, for accelerating the propellant, and for expelling the propellant so as to produce thrust.

20 Claims, 3 Drawing Sheets

(51) Int. Cl.
*F02K 9/44* (2006.01)
*F03H 99/00* (2009.01)
*F03H 1/00* (2006.01)

(56) References Cited

U.S. PATENT DOCUMENTS

| | | | | |
|---|---|---|---|---|
| 5,503,350 | A * | 4/1996 | Foote | B64C 39/024 244/1 R |
| 5,520,356 | A * | 5/1996 | Ensley | B64G 1/409 244/171.1 |
| 6,357,700 | B1 | 3/2002 | Provitola | |
| 6,442,374 | B1 | 8/2002 | Brady et al. | |
| 6,488,233 | B1 | 12/2002 | Myrabo | |
| 6,919,847 | B2 * | 7/2005 | Caplan | H01Q 1/248 343/705 |
| 6,968,676 | B1 * | 11/2005 | Krishnan | C06B 45/00 60/250 |
| 6,993,898 | B2 | 2/2006 | Parkin | |
| 7,194,852 | B1 * | 3/2007 | Krishnan | F02K 7/10 60/250 |
| 8,033,095 | B2 * | 10/2011 | Ciezki | F02K 9/44 60/203.1 |
| 2004/0156400 | A1 | 8/2004 | Caplan et al. | |
| 2011/0302906 | A1 * | 12/2011 | Sinko | B64G 1/646 60/204 |
| 2013/0199155 | A1 * | 8/2013 | Kare | F02K 9/42 60/211 |

OTHER PUBLICATIONS

PCT/US14/39980 Invitation to Pay Additional Fees and Parital Search Report dated Aug. 28, 2014, 7 pages.
PCT/US13/53450 International Search Report & Written Opinion mailed Jul. 8, 2014, 8 pages.
Schlesak, Joseph J et al., A Microwave Powered High Altitude Platform, 1988 IEEE MTT International Microwave Symposium Digest, vol. 1, pp. 284-286.
Reddy, M.V. et al., Microwave Power Transmission—A Next Generation Power Transmission System, IOSR J. of Electrical and Electronics Engineering, vol. 4, Issue 5 (Jan.-Feb. 2013), pp. 24-28.
Terdiman, Daniel, "Rocket scientist aims to relaunch propulsion technology", Oct. 20, 2010, URL:http://www.cnet.comjnewsjrocket-scientist-aims-to-relaunch-propulsion-technology, [retrieved on 2014-88-01].

* cited by examiner

EXTERNALLY POWERED HYBRID PROPULSION SYSTEM

FIELD OF THE INVENTION

Exemplary embodiments of the invention relate generally to the field of hybrid propulsion systems and, more particularly, to hybrid propulsion systems relying on an external source of energy to facilitate addition of energy to a propellant, which propellant may be expelled so as to produce thrust for propulsion of a vehicle.

BACKGROUND

A vehicle may be propelled by an engine that imposes a reaction force (i.e., thrust) by expulsion of matter in a desired direction. Thrust is related to momentum of the expelled matter, which depends upon both the velocity at which matter is expelled and the mass of the expelled matter. To accelerate the matter for expulsion from the propulsion system requires input of energy. It has been proposed to transmit energy from an off-board source to an on-board propulsion system in the form of an electromagnetic beam. Off-board sources that have been proposed include remote facilities such as a ground-based emitter or array of emitters. Energy transfer to the propellant may be limited by temperature-handling capabilities of the propellant heater. This temperature limitation translates directly to a limitation on the efficiency of the engine such that increases in efficiency require advances in both microwave absorbing capabilities, and temperature and pressure handling capabilities, of the materials. Accordingly, it is desirable to have improved systems and methods for transferring energy from an external source to a stream of propellant matter in a propulsion system.

A thruster may use external electromagnetic energy to accelerate a flow of propellant and to generate thrust by expelling the accelerated propellant. In such systems, a flow of propellant may first be established in the thruster, followed by coupling of microwave energy to heat and accelerate the flowing propellant, thereby generating a flow of heated propellant. The flow of heated propellant may be used to produce useful work such as by being delivered to an exhaust nozzle for expansion (i.e., acceleration) and thereby generating thrust as the propellant is expelled from the nozzle. Accordingly, it is desirable for the use of an electromagnetic thruster that means for establishing a flow of propellant be provided in connection with the electromagnetic thruster.

In addition to establishing a flow of propellant, it is desirable that, for use of an electromagnetic thruster to propel a vehicle, or to otherwise produce useful work, the vehicle hosting the thruster be positioned to receive the beam of electromagnetic energy. Unfortunately, it may not be feasible, for a number of reasons, for such a beam to be directed toward a vehicle while the vehicle is positioned on the surface of the earth. As a result, it is contemplated that it may be necessary to direct the energy beam upwardly from a ground-based source away from the surface of the earth. Accordingly, it is desirable to provide for delivery of the vehicle into the energy beam (i.e., into a flight trajectory phase that intersects the upwardly-directed energy beam).

To satisfy this desire, some have proposed delivering the target vehicle into an upwardly-directed energy beam using conventional vehicle propulsion means, such as a solid rocket booster, implemented as a first stage for launch of the vehicle. Others have suggested releasing the target vehicle from another flying vehicle, such as an aircraft. Unfortunately, these proposed delivery methods involve the expense and complexity of the additional stage or vehicle, tending to mitigate some of the advantages of using external propulsion systems. Thus, it is desirable to have an improved system and method for delivering a vehicle into an upwardly-directed beam of electromagnetic energy. It would further be advantageous if the improved system and method for delivering a vehicle into a beam of electromagnetic energy could provide a single stage to orbit capability.

In addition to the above-described issues, experience with propellant heaters, such as those that have been proposed for use in connection with an electromagnetic thruster, indicates that an energy absorptivity of a material suitable for use in a propellant heater may depend upon a temperature of the particular material. As a result, as a temperature of the propellant heater varies, its energy absorptivity also varies, resulting in non-optimum energy absorption characteristics at some operating conditions. As one skilled in the art will appreciate, it is desirable that the propellant heater function so as to efficiently absorb and/or transmit energy throughout the entire range of temperatures at which the propellant heater is to be operated. To address this desire, some have proposed that a dopant be applied in a non-uniform manner to a ceramic (e.g., SiC) material in such a way as to produce a propellant heater that is specially-adapted to the expected temperature profile.

Unfortunately, such an approach is limited in that a propellant heater, through which propellant is flowing, may not exhibit a constant temperature profile. In use, the propellant heater may exhibit a first temperature profile when the propellant heater is first exposed to the electromagnetic beam. After propellant flow has been established, and after efficient coupling has been achieved between the flow of propellant and the propellant heater used in the thruster, the first temperature profile is likely to have changed. As a result, it may be difficult to simultaneously achieve delivery of the vehicle into the energy beam, establishment of a flow of propellant, and efficient coupling between the flow of propellant and the propellant heater used in the thruster.

Conventional propulsion systems may achieve thrust by combining oxidizer and a propellant, relying on an exothermic chemical reaction between oxidizer and propellant to produce heat. This chemical reaction often occurs when the oxidizer is flowing though the core of the combustion chamber where it is permitted to react with the solid or jet propellant that may be packed into the core of the combustion chamber. Unfortunately, such an approach may be limited in its efficiency and may involve chemicals (propellant and/or oxidizer) that are toxic. Still further, the exothermic reaction can be difficult to control and, in fact, may be explosive in nature.

Accordingly, it is desirable to have an improved hybrid thruster for an externally-powered propulsion system, particularly wherein the system avoids or mitigates some or all the above-described problems that are inherent in the prior art.

SUMMARY

In one aspect of the invention, an exemplary hybrid propulsion system for a vehicle comprises a propellant tank for providing a supply of propellant, a propellant heater, and an exhaust nozzle. The propellant tank is in fluid communication with the propellant heater and is configured for providing a flow of propellant to the propellant heater. The propellant heater is in fluid communication with the propellant tank and the nozzle and initially comprises a supply of oxidizer that is configured for reacting chemically with the propellant to produce heat. The propellant heater is further configured for receiving a beam of microwave energy and facilitating transmission of the beam of microwave energy to the propellant. The nozzle is in fluid communication with the propellant heater and is configured for receiving a flow of propellant from the propellant heater, for accelerating the propellant, and for expelling the propellant so as to produce thrust.

In another aspect, an exemplary method of operating a hybrid propulsion system for a vehicle comprises providing a supply of propellant, a propellant heater, and a nozzle. The supply of propellant is in fluid communication with the propellant heater, and the propellant heater is in fluid communication with the supply of propellant and the nozzle. A quantity of oxidizer configured for reacting chemically with the propellant to produce heat is initially disposed in the propellant heater. A flow of propellant is established from the propellant tank to the propellant heater. During an initial flight phase of the vehicle, the propellant is reacted with the oxidizer in the propellant heater to produce a heated flow of propellant, which is delivered to the nozzle. During a subsequent flight phase of the vehicle, the propellant is heated with an external microwave beam in the propellant heater to produce a heated flow of propellant, which is delivered to the nozzle for delivery through the nozzle to outside the thruster.

In a further aspect, an exemplary vehicle comprises a hybrid propulsion system, which comprises a propellant tank for providing a supply of propellant, a propellant heater, and an exhaust nozzle. The propellant tank is in fluid communication with the propellant heater and is configured for providing a flow of propellant to the propellant heater. The propellant heater is in fluid communication with the propellant tank and the nozzle and initially comprises a supply of oxidizer, the oxidizer being configured for reacting chemically with the propellant to produce heat. The propellant heater is further configured for receiving a beam of microwave energy and facilitating transmission of the beam of microwave energy to the propellant. The nozzle is in fluid communication with the propellant heater and is configured for receiving a flow of propellant from the propellant heater, for accelerating the propellant, and for expelling the propellant so as to produce thrust.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

It is expressly understood that the invention as defined by the claims may be broader than the embodiments illustrated in the Figures and described in the detailed description section below.

DETAILED DESCRIPTION OF THE DRAWINGS

The following description is merely exemplary in nature and is not intended to limit the present disclosure, its application or uses. It should be understood that throughout the drawings, corresponding reference numerals indicate like or corresponding parts and features.

In an exemplary embodiment, a propulsion system is configured to take advantage of a hybrid approach, in which a flow of propellant is first established in the system, and in which an exothermic chemical reaction involving the propellant and an oxidizer provides heat to the propellant, which is expelled from the system so as to create thrust during an initial phase of a host vehicle trajectory. When the vehicle has entered a location where energy from the electromagnetic beam may be received, and when the thruster has reached a suitable operating condition, the propulsion system uses the external electromagnetic energy to heat the propellant and thereby provide thrust.

Figure 1:
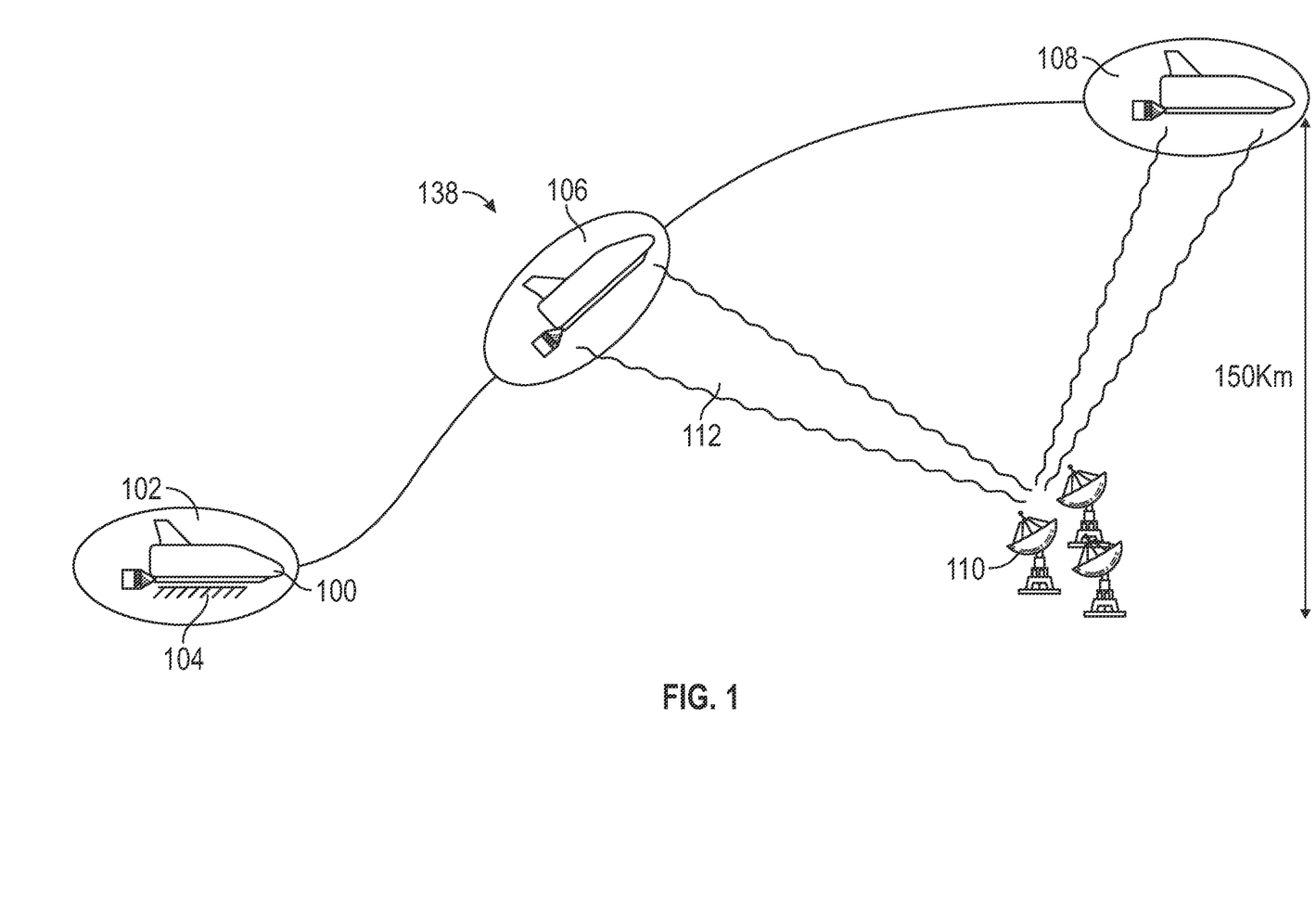
FIG. 1 is a diagrammatic view of an exemplary host vehicle in various phases of a flight trajectory.

FIG. 1 is a diagrammatic view of an exemplary host vehicle 100 in various phases of the flight trajectory of the host vehicle 100, which comprises an exemplary hybrid take-off thruster 114 for use in an externally-powered space launch system. As shown in FIG. 1, an exemplary host vehicle 100 begins its flight trajectory 138 in a first flight phase 102, at rest upon a launch pad 104 that is disposed on the surface of the earth. Also in the first flight phase 102, the host vehicle 100 launches (i.e., lifts off) from the launch pad 104 and climbs until it has attained sufficient altitude to reach the second flight phase 106, in which the host vehicle 100 may be powered externally as it climbs to third flight phase 108, wherein the vehicle 100 may have attained a stable orbit about the earth (e.g., at an altitude of approximately 150 km above the surface of the earth).

In conjunction with an exemplary external propulsion system 114, an array of microwave emitters 110 is disposed on or near the surface of the earth. The array of microwave emitters 110 is configured for emitting one or more microwave energy beams 112 in a desired direction and with one or more desired characteristics. It should be appreciated that the microwave energy beam 112 may comprise one or more beams of microwave energy, and each individual beam may be transmitted continuously or pulsed intermittently, so as to produce, in the aggregate, a desired transmission of microwave energy (i.e., a microwave energy beam) 112. In an exemplary embodiment, the array of microwave emitters 110 is configured to transmit electromagnetic energy at frequencies between approximately 500 MHz and approximately 300 GHz.

The array of microwave emitters 110 may include a single aperture antenna or a phased-array facility comprising a plurality of individual antennas serving as sources of electromagnetic energy and may be disposed in a variety of fixed or mobile locations. For example, the microwave emitters 110 may be ground-based (e.g., a fixed or mobile source disposed on land), sea-based (e.g., a fixed or floating platform disposed in or on a body of water, similar to an oil production platform, or mobile watercraft, such as a barge or an aircraft carrier), flight-based (e.g., carried on-board an aircraft, such as a fixed-wing aircraft, a balloon, or a blimp), satellite-based (e.g., carried aboard a vehicle 100 orbiting the earth, the moon, or another body), or space-based (i.e., carried aboard a vehicle 100 outside the orbit of any single body or set of bodies).

In an exemplary embodiment, a microwave emitter 110 comprises a microwave source (e.g., a gyrotron, magnetron, relativistic magnetron, klystron, or TWT or any other microwave emitting device), a waveguide system, a single aperture antenna or phased array of antennas. The microwave emitter 110 may also comprise a tracking mechanism configured for rotating, and thereby aiming, the antenna or array of antennas to facilitate pointing of the microwave energy beam 112 toward the host vehicle 100. The microwave emitter 110 may also comprise a phase tuner configured to provide fine-adjustments to the phasing of microwave emitters 110 so as to achieve more precise adjustments to the aiming of the microwave energy beam 112. Energy necessary to power the microwave emitter 110 may be provided by an established electric grid or by a dedicated energy generating power plant. In some applications, it may be advantageous for the necessary energy to be collected (e.g., via solar panels) and either stored for subsequent release as a microwave energy beam 112 or otherwise manipulated so as to be concurrently transmitted as a microwave energy beam 112.

For a variety of reasons, such as to avoid incidental exposure of nearby occupants to microwave energy, and/or to avoid undesired interference with communications, it may be desirable for the microwave emitters 110 to emit the microwave energy beam 112 in a direction or set of directions that avoid certain targets. For example, it may be desirable to direct the microwave energy beam 112 away from the surface of the earth. Accordingly, it may be impractical or impossible for the host vehicle 100 to be exposed to the microwave energy beam 112, or to receive appreciable quantities of microwave energy from the microwave energy beam 112, while the host vehicle 100 is in the first flight phase 102, on or near the launch pad 104.

During the second flight phase 106 and the third flight phase 108, however, the host vehicle 100 may be positioned to receive microwave energy from the microwave energy beam 112. Put another way, during the second flight phase 106 and the third flight phase 108, the array of microwave emitters 110 may be capable of directing (and it may be permissible to direct) the microwave energy beam 112 toward the host vehicle 100.

As shown in FIG. 1, in an exemplary embodiment, the third flight phase 108 begins when the host vehicle 100 has attained an orbital altitude (e.g., approximately 150 km above the surface of the earth). Thus, for convenience, the second flight phase 106 may be defined so as to extend from a point in the trajectory where the host vehicle 100 may be positioned to first receive microwave energy from the microwave energy beam 112 to a point where the third flight phase 108 begins.

During the first flight phase 102, including when the host vehicle 100 is positioned on or near a launch pad 104 and when the host vehicle 100 departs the launch pad 104 (i.e., lifts off), the host vehicle 100 may use energy produced by a hybrid thruster (not shown in FIG. 1) to propel the vehicle 100. In this first flight phase 102, stored energy is released through means that may include a chemical reaction such that the hybrid thruster operates in a chemical combustion mode. Thus, the launch vehicle 100 may be powered through the use of chemical energy until it reaches the second flight phase 106, where the electromagnetic (e.g., microwave) energy beam 112 from the array of microwave emitters 110 may begin providing energy to propel the host vehicle 100. As soon as sufficient energy has been received by the host vehicle 100 to cause the host vehicle 100 to accelerate to its orbital velocity and to insert the host vehicle 100 into orbit about the Earth, the microwave energy beam 112 may be terminated, concluding the launch sequence.

Figure 2:
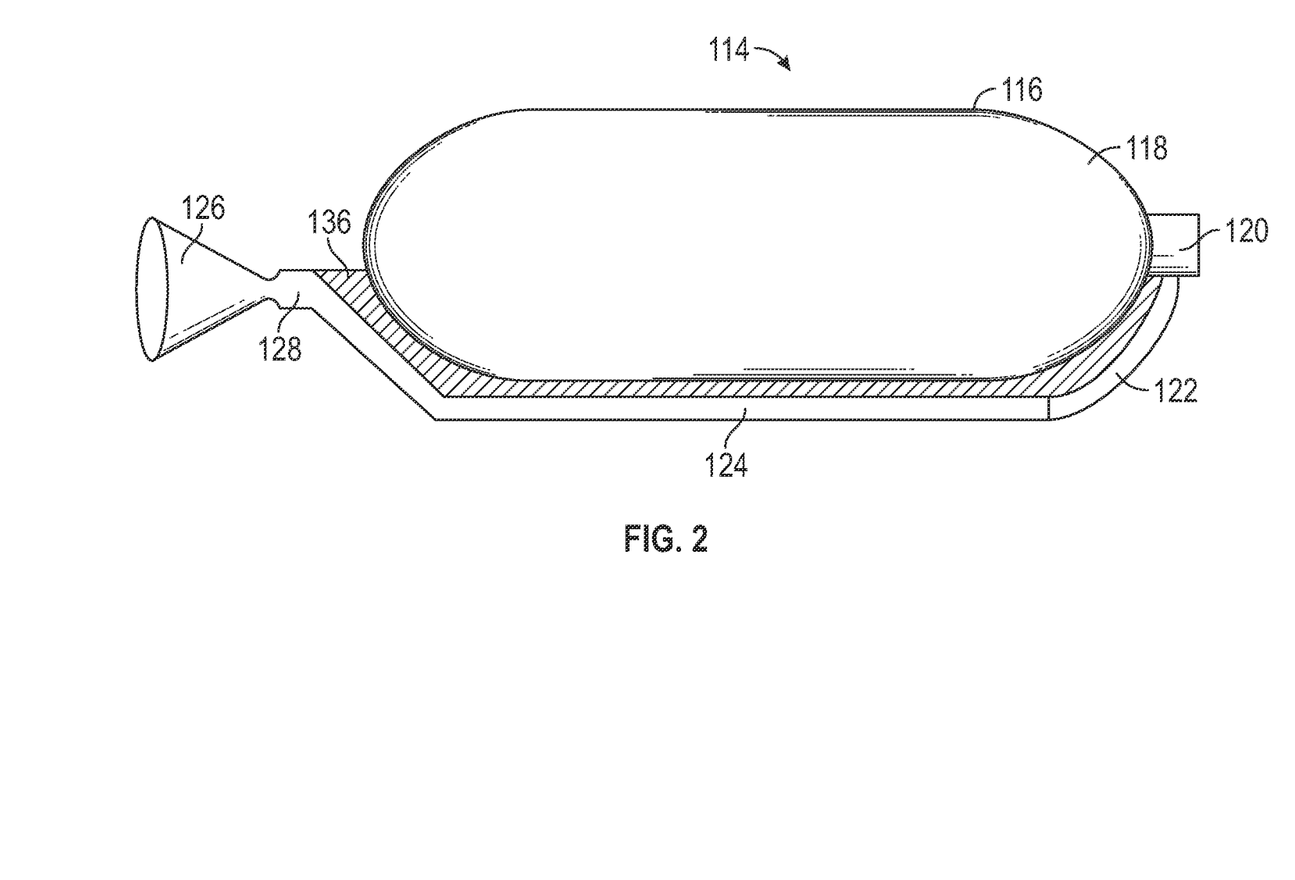
FIG. 2 is a simplified schematic diagram depicting portions of an exemplary launch vehicle configured for operation in accordance with the invention.

FIG. 2 is a simplified schematic diagram depicting an exemplary host (i.e., launch) vehicle 100 configured for operation in accordance with the invention. As shown in FIG. 2, an exemplary hybrid propulsion system (i.e., thruster) 114 comprises a propellant tank 116 providing a supply of propellant 118. A propellant pump 120, which may be disposed in fluid communication with the propellant tank 116 and a propellant heater 122, may be configured to draw a flow of propellant 118 from the propellant tank 116, compress the propellant 118, and provide the compressed propellant 118 to the propellant heater 122. The propellant heater 122 is configured to facilitate the addition of heat to, or release of heat within, the propellant 118 so as to produce a flow of heated propellant 118 exiting the propellant heater 122. In an exemplary embodiment, a quantity of oxidizer 124 may be provided in connection with the propellant heater 122 so as to provide an alternative or additional source of energy for adding heat to the flow of propellant 118 and thereby forming the flow of heated propellant 118.

The propellant heater 122 and/or the quantity of oxidizer 124 are in fluid communication with an exhaust nozzle 126. The exhaust nozzle 126 is configured for accelerating (i.e., expanding) the flow of heated propellant 118 and expelling the accelerated propellant 118 from the host vehicle 100 so as to generate thrust (i.e., to impart a reaction force upon the host vehicle 100). The flow of propellant 118 and/or the addition of heat to the propellant 118 and/or the geometry or orientation of the exhaust nozzle 126 may be modulated so as to control the magnitude and direction of the thrust force, which may be used for propulsion and/or control of the host vehicle 100. In an exemplary embodiment, a collecting manifold 128 may be disposed and configured for receiving the flow of heated propellant 118, mixing the propellant 118, and providing a supply of heated, mixed propellant 118 to the exhaust nozzle 126. Thus, as the heated propellant 118 moves through the exhaust nozzle 126, thrust for propelling and/or controlling the vehicle 100 is provided by the propellant 118.

In an exemplary embodiment, the exhaust nozzle 126 comprises a single converging-diverging (i.e., bell) nozzle configured for accelerating the flow of propellant 118 as it expands. It should be appreciated that the exhaust nozzle 126 may comprise any mechanism known in the art for accelerating a flow of fluid, including, for example, one or more converging-diverging (bell) nozzles, one or more converging nozzles (i.e., plug nozzles, air-spike nozzles), or a combination thereof, so as to convert stored energy (e.g., thermal energy) in the propellant (i.e., working fluid) 118 to kinetic energy as the propellant 118 is accelerated (e.g., expanded) in the exhaust nozzle 126.

Figure 3:
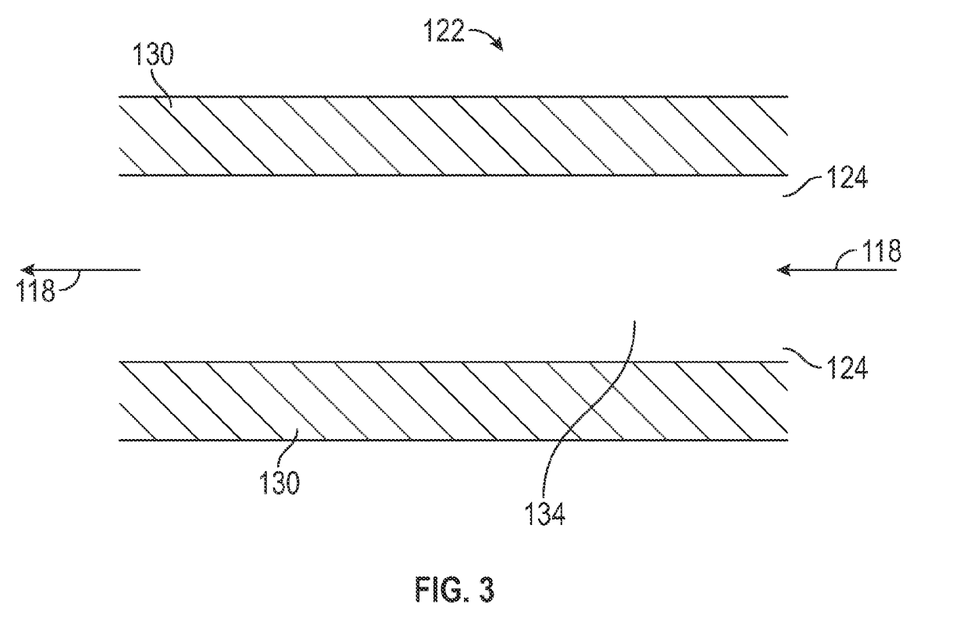
FIG. 3 is a simplified schematic diagram showing a diagrammatic view of an exemplary propellant heater with oxidizer disposed on inner surfaces of its propellant heater shell.
Figure 4:
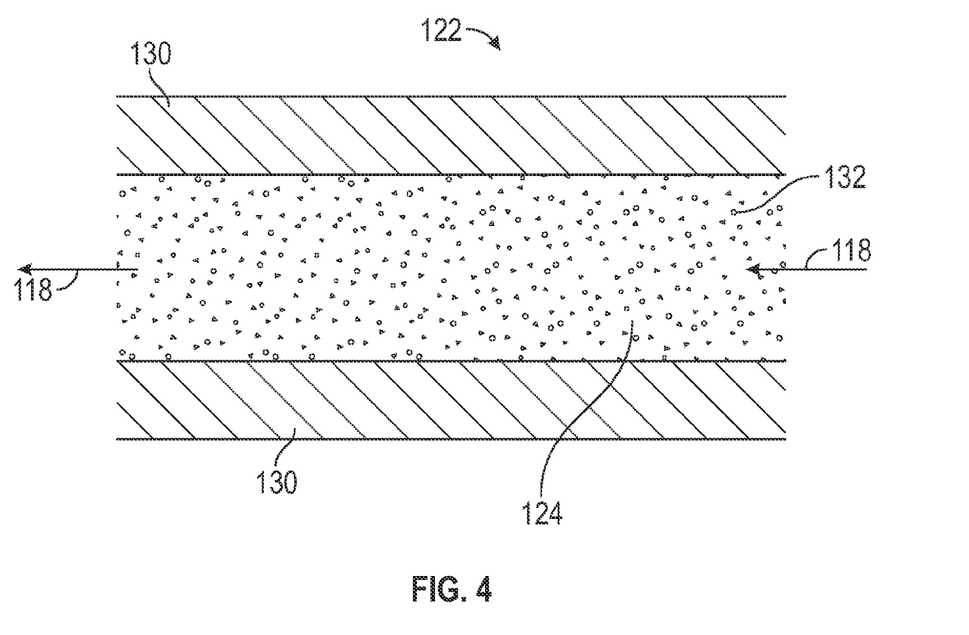
FIG. 4 shows a diagrammatic view of an exemplary propellant heater with oxidizer infiltrated into a foam media disposed within the propellant heater.

In an exemplary embodiment, as shown in FIG. 4, the propellant heater 122 may, at least initially (i.e., before initiation of the first flight phase 102), comprise a desired quantity of oxidizer 124. In accordance with this embodiment, the oxidizer 124 is disposed so that, during the initial flight phase, the oxidizer 124 may react chemically with the propellant 118 (e.g., combustion) so as to add heat to (i.e., release heat to) the mixture of propellant 118 and oxidizer 124. FIG. 3 shows a diagrammatic view of an exemplary propellant heater 122 with oxidizer 124 disposed on inner surfaces of propellant heater shell (i.e., walls) 130. As shown in FIG. 3, in an exemplary embodiment, the propellant heater 122 is partially filled with the oxidizer 124 along the inner surfaces of the shell (i.e., walls of the propellant heater) 130. The shell 130 of the propellant heater 122 comprises one or more materials suitable for external propulsion applications. Such materials include, but are not limited to, monolithic silicon carbide, ceramic matrix composite material based on silicon carbide.

In the disclosed hybrid propulsion system 114, propellant 118 flows though the propellant heater 122 with the walls coated with solid oxidizer 124 and reacts with the said oxidizer 124 to create a heated gas mixture exhausted from the thruster to produce thrust. The amount of oxidizer 124 coated or infiltrated into the propellant heater 122 is adjusted in such a way as to produce enough energy necessary to preheat the propellant heater 122 to high temperatures at which efficient absorption of microwaves is possible and create initial thrust necessary to deliver the launch vehicle 100 into the microwave beam at which stage the main part of orbital acceleration begins. By the time the launch vehicle 100 reaches the beam all of the oxidizer 124 may have been exhausted from the system, and the thruster may thereafter operate through the process by which propellant 118 is heated by electromagnetic energy absorbed in the propellant heater 122.

FIG. 4 shows a diagrammatic view of an exemplary propellant heater 122 with oxidizer 124 infiltrated into a foam media 132 disposed within the propellant heater 122. As shown in FIG. 4, in an exemplary embodiment, a propellant heater shell 130 defines a space between the walls (i.e., shell) 130 of the propellant heater 122, the space being at least partially filled with the foam (e.g., silicon carbide foam) media 132. In this embodiment, oxidizer 124 is infiltrated into the foam media 132, which fills either the entire propellant heater 122 or only a fraction of the propellant heater 122. The foam media 132 may be configured so as to improve thermal coupling between the propellant 118 and the propellant heater 122 and to allow for heating the propellant 118 to higher temperatures than might be possible in the absence of the foam media 132, leading to better performance of the hybrid propulsion system 114.

When the takeoff sequence is initiated, the propellant 118, which may comprise hydrogen, is drawn from the propellant tank 116, passes though the propellant pump 120 (e.g., a turbopump), and is delivered into the propellant heater 122, where the propellant encounters, and may react with, the oxidizer 124, which may be disposed in the propellant heater 122. The oxidizer 124 is formulated so as to react chemically and exothermally with the propellant 118 so as to provide a source of heat energy to the propellant 118 and the propellant heater 122. The quantity of oxidizer 124 disposed for reaction with the propellant 118 is provided based on the amount of energy required for operating the vehicle 100 during the first flight phase 102 and delivering the host vehicle 100 to a location where the second flight phase 106 may begin.

In an exemplary embodiment, wherein the oxidizer 124 is disposed in the propellant heater 122, the oxidizer 124 may be configured so as to be depleted via chemical reaction with the propellant 118 approximately when the host vehicle 100 reaches the second flight phase 106, leaving the propellant heater 122 with an internal geometry and composition that is configured for a desirable flow of propellant 118 through the propellant heater 122. Thus, the quantity of oxidizer 124 disposed within the propellant heater 122 is sufficient to produce thrust during the first flight phase 102 but may also be not so great as to remain in the propellant heater 122 when the host vehicle 100 reaches the second flight phase 106, wherein the electromagnetic (e.g., microwave) energy beam 112 may provide an external source of energy to heat the propellant 118 in the propellant heater 122. Since the external electromagnetic energy from the microwave energy beam 112 may be used to heat the propellant 118 throughout the second flight phase 106 and the third flight phase 108, the oxidizer 124 is not needed after the transition from the first flight phase 102 to the second flight phase 106.

The propellant pump 120 is configured for motivating the propellant 118 to flow through the system and may comprise any type of pumping apparatus suitable for that purpose, including a turbopump. In an exemplary embodiment, the propellant pump 120 is powered by a source of stored energy, such as a battery (not shown), or by a turbine (not shown) that is driven by expansion of propellant 118 from the propellant tank 116 following the propellant's absorption of energy from either the oxidizer 124 or the microwave energy beam 112. Thus, the propellant tank 116 and the propellant pump 120 cooperate to provide a source of propellant 118 for the hybrid propulsion system 114. In an exemplary embodiment, the propellant tank 116 is configured to supply propellant 118 comprising hydrogen. The propellant tank 116 may also be configured to supply another propellant 118 that reacts exothermally with an oxidizer.

It should be appreciated that suitable controls mechanisms, including one or more fluidic throttle valves and suitable instrumentation, (not shown) may be disposed in the path of the propellant 118 and that a suitable control system such as a digital electronic control system comprising a processor coupled to a memory storage device, on which memory storage device instructions may be stored, with such instructions being configured for providing for the effective control of the flow of propellant 118 in response to feedback received from system instrumentation or other commands received by the control system (not shown) may also be disposed and coupled to the fluidic throttle valves and the instrumentation so as to facilitate effective control over the flow rate and pressure of the propellant 118.

In an exemplary embodiment, as shown in FIG. 3 and FIG. 4, a propellant heater 122 comprises a propellant heater shell 130 that defines a heating cavity 134 disposed within the propellant heater shell 130. The propellant heater 122 is configured for receiving the propellant 118 from the propellant pump 120 into the heating cavity 134. The propellant heater 122 is also configured to receive the microwave energy beam 112 and to facilitate heating of the propellant 118 by the microwave energy beam 112. At least a portion of the propellant heater shell 130 may be configured to transmit microwave energy received from the microwave energy beam 112 directly to the propellant 118 in the heating cavity 134, so as to facilitate absorption of microwave energy beam 112 by the propellant 118 in the heating cavity 134, and so as to thereby facilitate production of a stream of heated (i.e., energized) propellant 118. In an exemplary embodiment, the transmission of microwave energy substantially directly to the propellant 118 in the heating cavity 134 is to be achieved while avoiding, at least partially, and preferably substantially, the absorption of microwave energy by the propellant heater shell 130.

In an exemplary embodiment, to facilitate the transmission of microwave energy directly to the propellant 118 in the heating cavity 134, portions of the propellant heater shell 130 that are substantially transmissive may be disposed in positions of the propellant heater shell 130 where it is desired to transmit microwave energy directly to the stream of propellant 118. These substantially transmissive portions of the propellant heater shell 130 are configured to be substantially transparent to such transmissions of microwave energy. Put another way, the propellant heater shell 130 that defines the heating cavity 134 comprises one or more regions that are substantially transparent to transmissions of microwave energy. As such, the propellant heater shell 130 may comprise a material that is substantially transparent to transmissions of microwave energy (i.e., a microwave transmitting material), and the microwave transmitting material may be disposed in regions of the propellant heater shell 130 that are expected to be disposed in the path of the microwave energy beam 112 between the propellant 118 that is passing through the heating cavity 134 and the array of microwave emitters 110.

In an exemplary embodiment, in addition to one or more microwave energy transmitting portions, the propellant heater shell 130 may include one or more microwave energy reflecting portions. The energy transmitting portions are positioned and configured so as to receive the microwave energy beam 112 and to transfer the microwave energy to the stream of propellant 118 in the form of thermal energy. A coating may be disposed on the energy transmitting portions so as to face in a direction toward the incipient microwave energy beam 112 (e.g., facing in an outward direction from the propellant heater 122). It should be appreciated that the propellant heater 122 is thus configured so that the microwave energy beam 112 transmitted toward the propellant heater 122 first encounters the transmissive coating disposed on the energy transmitting portions of the propellant heater 122.

In an exemplary embodiment, the propellant heater shell 130 comprises a ceramic matrix composite (CMC) material configured to improve mechanical/structural strength and reliability (i.e., mechanical robustness) of the propellant heater 122. In an exemplary embodiment, the CMC material comprises structural fibers that are arranged and distributed so as to provide a propellant heater 122 that exhibits structural strength similar to that of metal with reduced weight while also providing the ability to absorb electromagnetic (microwave) energy from the microwave energy beam 112.

In an exemplary embodiment, the propellant heater shell 130 comprises a continuous phase (matrix) with a chemical composition that is adjusted so as to provide improved ability to selectively absorb and/or transmit microwave energy from the microwave energy beam 112. For example, in embodiments wherein the propellant heater shell 130 comprises a CMC material including silicon carbide fiber (distributed phase) and silicon carbide matrix, the matrix component may be doped with a quantity of dopant configured to provide suitable ability to absorb and/or transmit microwave energy from the microwave energy beam 112 considering the particular configuration of the propellant heater 122 and the particular mode of operation.

In an exemplary embodiment, the propellant heater coating may comprise a material that is electromagnetically active (i.e., a meta-material). In such embodiments, a pattern of small (i.e., having dimensions that are typically smaller that the wavelength of the incoming electromagnetic energy) meta-material elements may be embedded into the coating deposited on the propellant heater 122. Such meta-material coatings may be configured to produce desirable electromagnetic absorption/transmission characteristics.

A layer of insulating material 136 may be disposed on the energy reflecting portions so as to retain thermal energy within the propellant heater 122. In an exemplary embodiment, the insulating layer is disposed so as to resist conduction of thermal energy out of the propellant heater 122. In an exemplary embodiment, the insulating layer comprises an aerogel blanket. In another exemplary embodiment, the insulating layer comprises aero-gel-filled foam, such as silicon carbide foam. In an exemplary embodiment, the propellant heater 122 is insulated from the propellant tank 116 by the layer of insulating material 136 being disposed between the propellant heater 122 and the propellant tank 116. In an exemplary embodiment, the layer of insulating material 136 is disposed on an external surface of the propellant heater 122, the external surface being disposed adjacent to the propellant tank 116. Thus, the layer of insulating material 136 is disposed and configured so as to prevent or reduce or otherwise regulate departure of thermal energy from the propellant heater 122 through the propellant heater shell 130, and in particular, to prevent (or control the rate of) transfer of thermal energy from the propellant heater 122 to the propellant tank 116 or any other adjacent component of the hybrid propulsion system 114.

Thus, in an exemplary embodiment, a hybrid propulsion system 114 for a host vehicle 100 employs a stored source of energy, such as may be released by chemical reaction between two or more reactants, to produce thrust during one or more phases of a launch sequence. Accordingly, an exemplary thruster may rely upon energy released through an exothermic chemical reaction facilitated during a takeoff phase and/or an initial phase along a launch trajectory, i.e., before the host vehicle 100 powered by the thruster enters an area of, or is otherwise affected by, a source of external energy such as an electromagnetic (e.g., microwave) energy beam 112 providing energy to the hybrid propulsion system 114 for acceleration of the host vehicle 100.

It should be appreciated that exemplary embodiments of the externally powered propulsion systems disclosed herein may be used to launch space vehicles (i.e., for space launch) or to provide propulsion at lower altitudes (i.e., for suborbital launch and atmospheric flight). Using aiming technologies as described above, the array of microwave emitters 110 may be configured to accurately aim the microwave energy beam 112 at the host vehicle 100 (i.e., to target the host vehicle 100) and to follow the host vehicle 100 (i.e., to track the host vehicle 100) as it traverses the second flight phase 106 and third flight phase 108 of its trajectory. Accordingly, a system and method are provided that can achieve delivery of a host vehicle 100 into an upwardly-directed energy beam 112, while also establishing a flow of propellant 118 through the system, and efficiently coupling the flow of propellant 118 and the microwave energy beam 112 in the propellant heater 122 of the hybrid thruster system.

The invention has been described above primarily with reference to its application in a propulsion system for a launch vehicle. It should be clear to one skilled in the art of systems for propelling vehicles, and of machines for otherwise converting energy, that systems of other varied configurations and for other uses such as generation of power or useful work can easily be envisaged and that the invention should not, and cannot be limited to those examples provided herein. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A hybrid propulsion system for a vehicle, the hybrid propulsion system comprising:
   a propellant tank for providing a flow of propellant;
   a propellant heater; and an exhaust nozzle;
   the propellant tank being in fluid communication with the propellant heater and configured for providing the flow of propellant to the propellant heater;
   the propellant heater being in fluid communication with the propellant tank and the exhaust nozzle, the propellant heater initially containing a quantity of a solid oxidizer, the quantity of the solid oxidizer being configured for reacting chemically with the flow of propellant to produce heat by combustion;
   the propellant heater being further configured for receiving a beam of microwave energy emitted by a microwave source separate from the vehicle, the propellant heater facilitating transmission of the beam of microwave energy to the flow of propellant; and
   the exhaust nozzle being in fluid communication with the propellant heater for receiving the flow of propellant from the propellant heater, the exhaust nozzle for accelerating the flow of propellant and for expelling the flow of propellant to produce thrust.

2. The hybrid propulsion system of claim 1, wherein the flow of propellant comprises hydrogen.

3. The hybrid propulsion system of claim 1, wherein the quantity of the solid oxidizer is infiltrated into a refractory foam disposed within the propellant heater.

4. The hybrid propulsion system of claim 1, wherein the propellant heater comprises silicon carbide.

5. The hybrid propulsion system of claim 1, wherein the propellant heater comprises a ceramic matrix composite material.

6. The hybrid propulsion system of claim 1, wherein a manifold is disposed between the propellant heater and the exhaust nozzle, the manifold containing oxidizer.

7. The hybrid propulsion system of claim 1, wherein the propellant heater comprises a propellant heater shell, at least a portion of which is substantially transmissive to a beam of electromagnetic energy.

8. A method of operating a hybrid propulsion system for a vehicle comprising:
   providing a flow of propellant, a propellant heater, and a nozzle, the flow of propellant being in fluid communication with the propellant heater, the propellant heater being in fluid communication with the flow of propellant and the nozzle;
   initially disposing, in the propellant heater, a quantity of a solid oxidizer configured for reacting chemically with the flow of propellant to produce heat by combustion;
   establishing the flow of propellant to the propellant heater;
   during an initial flight phase of the vehicle:
      chemically reacting the flow of propellant with the quantity of the solid oxidizer in the propellant heater to produce a heated flow of propellant; and
      delivering the heated flow of propellant from the propellant heater to the nozzle for delivery through the nozzle to outside the vehicle; and
   during a subsequent flight phase of the vehicle:
      generating an external microwave beam by a microwave source separate from the vehicle,
      heating the flow of propellant with the external microwave beam in the propellant heater to produce a microwave beam heated flow of propellant; and
      delivering the microwave beam heated flow of propellant from the propellant heater to the nozzle for delivery through the nozzle to outside the vehicle.

9. The method of operating a hybrid propulsion system of claim 8, wherein the flow of propellant comprises hydrogen.

10. The method of operating a hybrid propulsion system of claim 8, wherein the quantity of oxidizer is infiltrated into a refractory foam disposed within the propellant heater.

11. The method of operating a hybrid propulsion system of claim 8, wherein the propellant heater comprises silicon carbide.

12. The method of operating a hybrid propulsion system of claim 8, wherein the propellant heater comprises a ceramic matrix composite material.

13. The method of operating a hybrid propulsion system of claim 8, wherein a manifold is disposed between the propellant heater and the nozzle, the manifold containing oxidizer.

14. The method of operating a hybrid propulsion system of claim 8, wherein the propellant heater comprises a propellant heater shell, at least a portion of which is substantially transmissive to a beam of electromagnetic energy.

15. A vehicle comprising a hybrid propulsion system, the hybrid propulsion system comprising:
   a propellant tank for providing a supply of propellant comprising hydrogen;
   a propellant heater; and
   an exhaust nozzle;
   the propellant tank being in fluid communication with the propellant heater and configured for providing a flow of propellant to the propellant heater;
   the propellant heater being in fluid communication with the propellant tank and the exhaust nozzle, the propellant heater initially containing a quantity of a solid oxidizer, the quantity of the solid oxidizer configured for reacting chemically with the flow of propellant to produce heat by combustion;
   the propellant heater being further configured for receiving a beam of microwave energy emitted by a microwave source separate from the vehicle, the propellant heater facilitating transmission of the beam of microwave energy to the flow of propellant; and
   the exhaust nozzle being in fluid communication with the propellant heater for receiving the flow of propellant from the propellant heater, the exhaust nozzle for accelerating the flow of propellant and for expelling the flow of propellant to produce thrust to propel the vehicle.

16. The vehicle of claim 15, wherein the quantity of the solid oxidizer is infiltrated into a refractory foam disposed within the propellant heater.

17. The vehicle of claim 15, wherein the propellant heater comprises silicon carbide.

18. The vehicle of claim 15, wherein the propellant heater comprises a ceramic matrix composite material.

19. The vehicle of claim 15, wherein a manifold is disposed between the propellant heater and the exhaust nozzle, the manifold containing oxidizer.

20. The vehicle of claim 15, wherein the propellant heater comprises a propellant heater shell, at least a portion of which is substantially transmissive to a beam of electromagnetic energy.

* * * * *